US010678562B2

(12) United States Patent
Hurd et al.

(10) Patent No.: US 10,678,562 B2
(45) Date of Patent: Jun. 9, 2020

(54) SYSTEMS AND METHODS FOR FACILITATING REAL-TIME ANALYTICS

(71) Applicant: K&M Systems, Inc., San Diego, CA (US)

(72) Inventors: Alexander Hurd, Cincinnati, OH (US); Kurtis Cahill, Smithville, MO (US)

(73) Assignee: K&M Systems, Inc., San Diego, CA (US)

( * ) Notice: Subject to any disclaimer, the term of this patent is extended or adjusted under 35 U.S.C. 154(b) by 366 days.

(21) Appl. No.: 15/814,165

(22) Filed: Nov. 15, 2017

(65) Prior Publication Data

US 2018/0136952 A1 May 17, 2018

Related U.S. Application Data

(60) Provisional application No. 62/423,717, filed on Nov. 17, 2016, provisional application No. 62/423,718, filed on Nov. 17, 2016.

(51) Int. Cl.
| | | |
|---|---|---|
| *G06F 9/44* | (2018.01) | |
| *G06F 9/445* | (2018.01) | |
| *G06F 8/35* | (2018.01) | |
| *G06F 9/448* | (2018.01) | |
| *G06F 11/34* | (2006.01) | |
| *G06F 11/30* | (2006.01) | |
| *G06F 11/36* | (2006.01) | |
| *G06F 8/20* | (2018.01) | |

(52) U.S. Cl.
CPC ............ *G06F 9/44557* (2013.01); *G06F 8/35* (2013.01); *G06F 9/449* (2018.02); *G06F 9/4488* (2018.02); *G06F 11/302* (2013.01); *G06F 11/3093* (2013.01); *G06F 11/34* (2013.01); *G06F 11/3644* (2013.01); *G06F 8/24* (2013.01); *G06F 2201/865* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 6,374,252 B1 * | 4/2002 | Althoff | ................. G06F 16/258 |
| 6,931,491 B2 | 8/2005 | Gray et al. | |
| 8,341,191 B2 | 12/2012 | Weinberg | |
| 8,578,352 B1 * | 11/2013 | Mitrovic | ............... G06F 9/4552 |
| | | | 717/140 |
| 8,892,576 B2 | 11/2014 | Krleza | |
| 8,935,293 B2 | 1/2015 | Park et al. | |
| 9,495,475 B2 | 11/2016 | Weinberg et al. | |

(Continued)

*Primary Examiner* — Jae U Jeon
(74) *Attorney, Agent, or Firm* — Kilpatrick Townsend & Stockton LLP

(57) ABSTRACT

Provided herein are methods, systems, and computer-program products for providing a library of base classes to be used by applications to facilitate real-time analytics. In some examples, the library may be a C++ Library that provides a set of primitive operators (e.g., spout base class, tube base class, and sink base class) for user derivation. In some examples, the spout base class may relate to receiving data from a data source, the tube base class may relate to performing one or more operations on the received data, and the sink base class may relate to sending the processed data to a data target. The spout, tube, sink together provide a real-time streaming framework interface that may be extended by the user.

20 Claims, 12 Drawing Sheets

(56) References Cited

U.S. PATENT DOCUMENTS

| | | |
|---|---|---|
| 9,690,800 B2 | 6/2017 | Branson et al. |
| 9,875,281 B2 | 1/2018 | Barsness et al. |
| 9,904,520 B2 | 2/2018 | Cao et al. |
| 10,031,946 B2 | 7/2018 | Barsness et al. |
| 2005/0097514 A1* | 5/2005 | Nuss .................. G06F 8/31 717/114 |
| 2006/0150146 A1* | 7/2006 | Meijer ............... G06F 9/4492 717/108 |
| 2017/0300300 A1 | 10/2017 | Cao et al. |

* cited by examiner

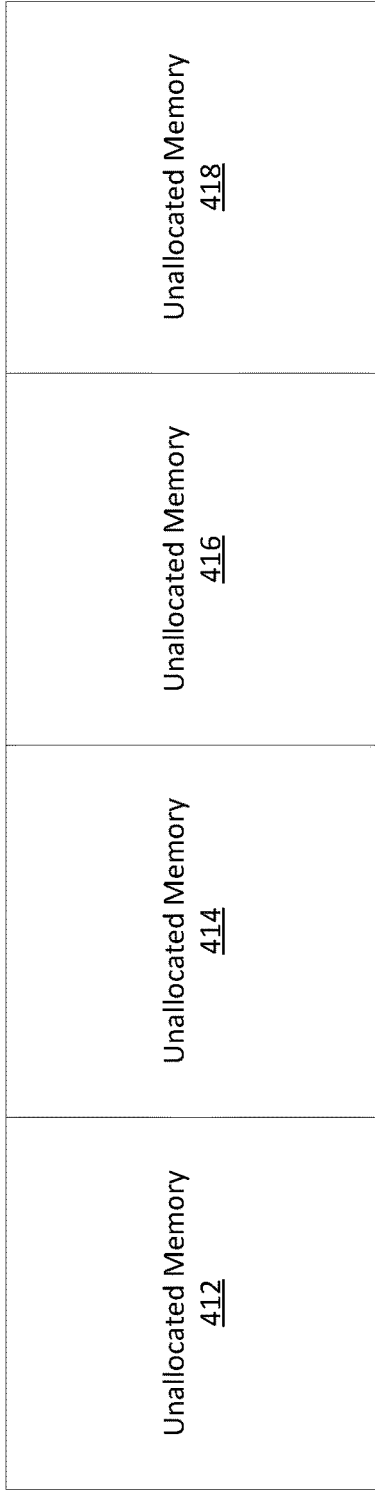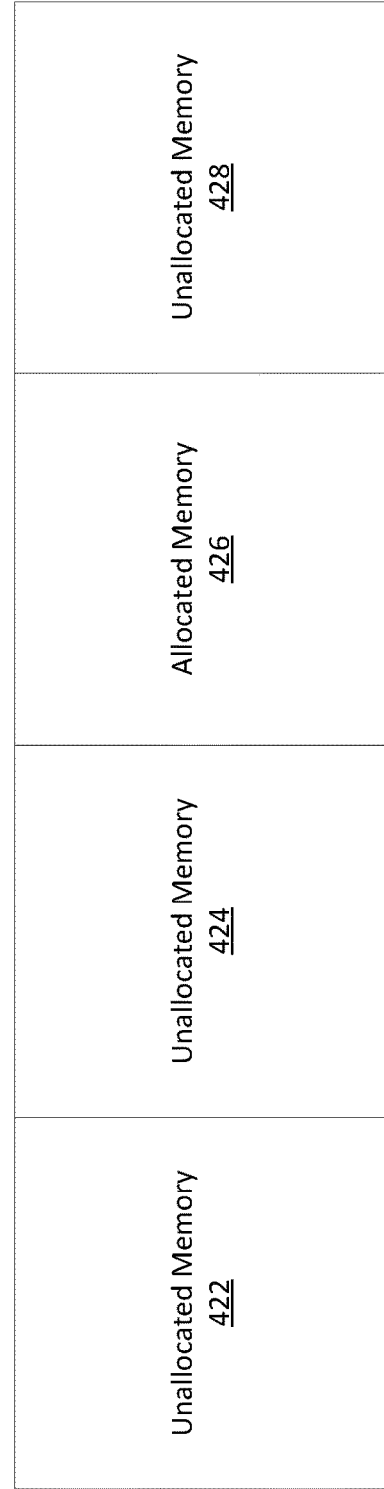

SYSTEMS AND METHODS FOR FACILITATING REAL-TIME ANALYTICS

CROSS-REFERENCES TO RELATED APPLICATIONS

The present application claims the benefit of and priority to U.S. Provisional Application No. 62/423,717, filed Nov. 17, 2016, and U.S. Provisional Application No. 62/423,718, filed Nov. 17, 2016, the disclosures of which are hereby incorporated by reference in their entireties for all purposes.

BACKGROUND

Data analytics typically includes examining raw data to draw conclusions. However, because of the amount of raw data, most systems today either limit the amount of data or require a large amount of time to process. The large amount of time may be at least partially attributed to the number of levels of abstraction for many solutions. In particular, by trying to provide a one-size-fits-all system, solutions become slower and slower as the amount of data increases. Therefore, there is a need in the art for improved techniques for real-time analytics.

SUMMARY

Provided herein are methods, systems, and computer-program products for providing a library of base classes to be used by applications to facilitate real-time analytics. In some examples, the library may be a C++ Library that provides a set of primitive operators (e.g., spout base class, tube base class, and sink base class) for user derivation. In some examples, the spout base class may relate to receiving data from a data source, the tube base class may relate to performing one or more operations on the received data, and the sink base class may relate to sending the processed data to a data target. The spout, tube, sink together may provide a real-time streaming framework interface that may be extended by the user.

In some examples, the C++ Library may be used for a real-time analytics system and may include multi-threading operators that are connected using message queues. In such examples, the real-time analytics system may include low-level optimized native code that enables greater efficiency. The real-time analytics system may include memory efficient data structures and memory management systems to create a highly flexible and customizable system.

In some implementations, a method, system, and computer-program product for real-time analytics tracking is provided. For example, a method may include providing a library of base classes. In some examples, a base class may include a header and a precompiled binary. The header may expose the base class to an application using the library, and the precompiled binary may include implementation of the base class. In some examples, the base classes may include a spout base class, a tube base class, and a sink base class.

The method may further include executing a customized spout. In some examples, the customized spout may be derived from the spout base class. In such examples, the customized spout may include one or more instructions for obtaining data. The method may further include obtaining data based upon the one or more instructions. In some examples, the data may be obtained using the customized spout. The method may further include generating one or more tuples including at least a portion of the obtained data. In some examples, the one or more tuples may be generated using the customized spout. In some examples, a tuple may be associated with a pointer. In such examples, the pointer may refer to a memory location of the tuple.

The method may further include executing a customized tube. In some examples, the customized tube may be derived from the tube base class. In such examples, the customized tube may include one or more functions to perform on the one or more tuples using one or more pointers corresponding to the one or more tuples. In some examples, the one or more customized functions might not be defined in the tube base class. The method may further include performing the one or more customized functions on a tuple of the one or more tuples. In some examples, the one or more customized functions may be performed using the customized tube.

The method may further include executing a customized sink. In some examples, the customized sink may be derived from the sink base class. In such examples, the customized sink may include one or more endpoints for a result of performing the one or more customized functions on the one or more tuples. The method may further include storing the result to a memory location. In some examples, the result may be stored using the customized sink.

In some implementations, a method, system, and computer-program product for real-time analytics tracking is provided. For example, a method may include allocating memory from a heap of a computer system. In some examples, the allocated memory may be a predefined size. The method may further include associating the allocated memory with a memory pool system. In some examples, the memory pool system may manage the allocated memory for the analytics system.

The method may further include identifying data to be processed by the analytics system, identifying an amount of memory required to store the data, determining that the memory pool system is associated with at least the amount of memory required to store the data, and storing the data in a portion of the allocated memory. The method may further include associating a pointer with the portion of the allocated memory. In some examples, the pointer may be a value that identifies the portion of the allocated memory. In such examples, the memory pool system may include the pointer.

The method may further include reserving the tuple for the data such that other data cannot be stored in the portion of the allocated memory, performing one or more operations on the data using the pointer, and sending a result of performing the one or more operations on the data to a target system. The method may further include unreserving the tuple for the data such that the pointer is sent back to the memory pool system. In some examples, unreserving may be in response to the result being sent Numerous benefits are achieved by way of the present disclosure over conventional techniques. For example, embodiments of the present disclosure provide a real-time streaming analytic framework that is faster than others in the market due to inherent customization included by using base classes. These and other embodiments of this disclosure, along with many of its advantages and features, are described in more detail in conjunction with the text below and attached figures.

BRIEF DESCRIPTION OF THE DRAWINGS

FIG. 4A illustrates an example of a heap with unallocated memory.

FIG. 4B illustrates an example of a heap with allocated and unallocated memory.

DETAILED DESCRIPTION

Figure 1:
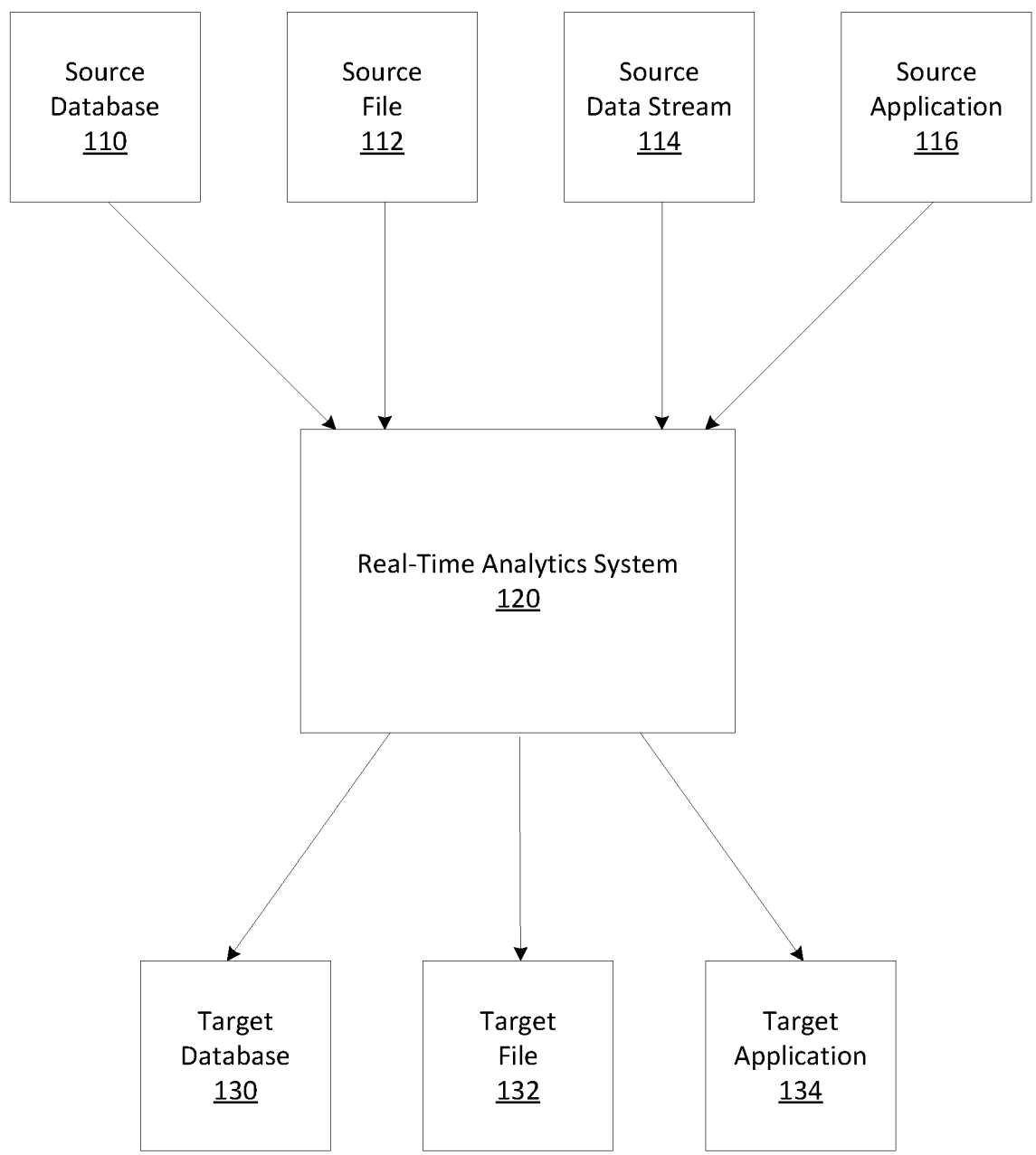
FIG. 1 illustrates an example of an environment for a real-time analytics system.

In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

As the amount of available data increases, so does the need for understanding this data in real time. Real-time analytics is the use of data and related resources at a level of computer responsiveness that a user senses as immediate or nearly immediate, or that enables a computer to keep up with some external process (e.g., to present visualizations of activity as it constantly changes). In some examples, real-time analytics is known as dynamic analysis, real-time analysis, real-time data integration, or real-time intelligence.

Provided herein are methods, systems, and computer-program products for providing a library of base classes to be used by applications to facilitate real-time analytics. The library of base classes allows classes derived from each of the base classes to pre-include the ability to interface with classes derived from other base classes in the library. Therefore, when deriving classes from the base classes, additional code may be limited to that which is device, system, and/or source specific, thereby increasing the speed, reliability, and efficiency when creating a system for real-time analytics. The library of base classes also provides memory management of classes derived from the base class without additional work being required when deriving the classes. The memory management may be a real benefit because it may allow a computer to perform better when analyzing real-time information. While real-time analytics is discussed, the methods, systems, and computer-program products may also be used to facilitate extracting, transforming, and loading one or more databases and providing information to other systems (e.g., a network monitoring system, an alarm system, and/or a pattern recognition system).

In some examples, the library may be a C++ Library that provides a set of primitive operators (e.g., spout, tube, and sink) for user derivation. In some examples, a real-time analytics system may be implemented by multi-threading operators that are connected using message queues. The real-time analytics system may include memory efficient data structures including custom memory allocation pools (sometimes referred to as a memory pool). The real-time analytics system may be highly flexible and customizable. In some examples, the real-time analytics system may be low-level optimized native code that enables it to run efficiently with minimal overhead.

FIG. 1 illustrates an example of an environment for a real-time analytics system 120. The environment may include one or more data sources (e.g., a source database 110, a source file 112, a source data stream 114, a source application 116, unstructured data, or any other suitable source of data). In some examples, the one or more data sources may be connected to the real-time analytics system 120 using a wired or wireless connection. In such examples, a wireless connection may be a network (e.g., the Internet, a wireless connection, a wired connection, or some other connection method). In other examples, the one or more data sources may be located on the same computer system as the real-time analytics system 120. In some examples, the real-time analytics system 120 may receive data from the one or more data sources. In some examples, data from one or more data sources may be combined before being received by the real-time analytics system 120.

As described above, a data source may be the source database 110. The source database 110 may be an organized collection of data. In some examples, the source database 110 may be a collection of related data. The source file 112 may be located on a computer system, in a database (such as the source database 110), or a different storage system. In some examples, the source file 112 may be a resource for storing information, which may be available to a computer program. In such examples, the information may be stored in a durable storage medium (e.g., storage that remains available for other programs to use after the program that created the information has finished executing).

The source data stream 114 may be a sequence of signals used to transmit information. In such examples, the sequence of signals may be digitally encoded coherent signals (e.g., packets of data or data packets). In some examples, streaming data from the source data stream 114 may be received by the real-time analytics system 120. In such examples, the real-time analytics system 120 may include a component that scans one or more locations (e.g., a database, a directory of a computer, a file, or the like). In some examples, the real-time analytics system 120 may open a port (according to an Internet protocol suite such as the Transmission Control Protocol (TCP) or the Internet Protocol (IP)) to receive data from the source data stream 114.

In some examples, the data source may be the source application 116. For example, the source application 116 may include data to be used by the real-time analytics system 120. In such an example, the real-time analytics system 120 may either obtain the data from the source application 116 or receive the data from the source application 116.

The environment may further include one or more data targets (e.g., a target database 130, a target file 132, a target application 134, a network listener, a message queue, a remote sensor, or any other destination for data). For illustrative examples, the target file 132 may be a comma separated values file, an EXtenssible Markup Language (XML) file, or any other compressed or uncompressed file. For an illustrative example, a network listener may be a TCP socket (binary or flat files). In some examples, the real-time analytics system 120 may send data processed by the real-time analytics system 120 to the one or more data targets. In some examples, the real-time analytics system 120 may store data processed by the real-time analytics system 120 in the one or more data targets. In some examples, a data target of the one or more data targets may be located on the same computer system as the real-time analytics system 120. In other examples, the data target may be on another computer system, and may be either on the same network or on a different network as the real-time analytics system 120.

In some examples, a first data target and a second data target may be located on the same or different computer systems. In some examples, a data target may correspond to (e.g., be the same as) a data source. For example, data received from a data source may be stored or written to the same data source after the real-time analytics system 120 processes the data.

Figure 2:
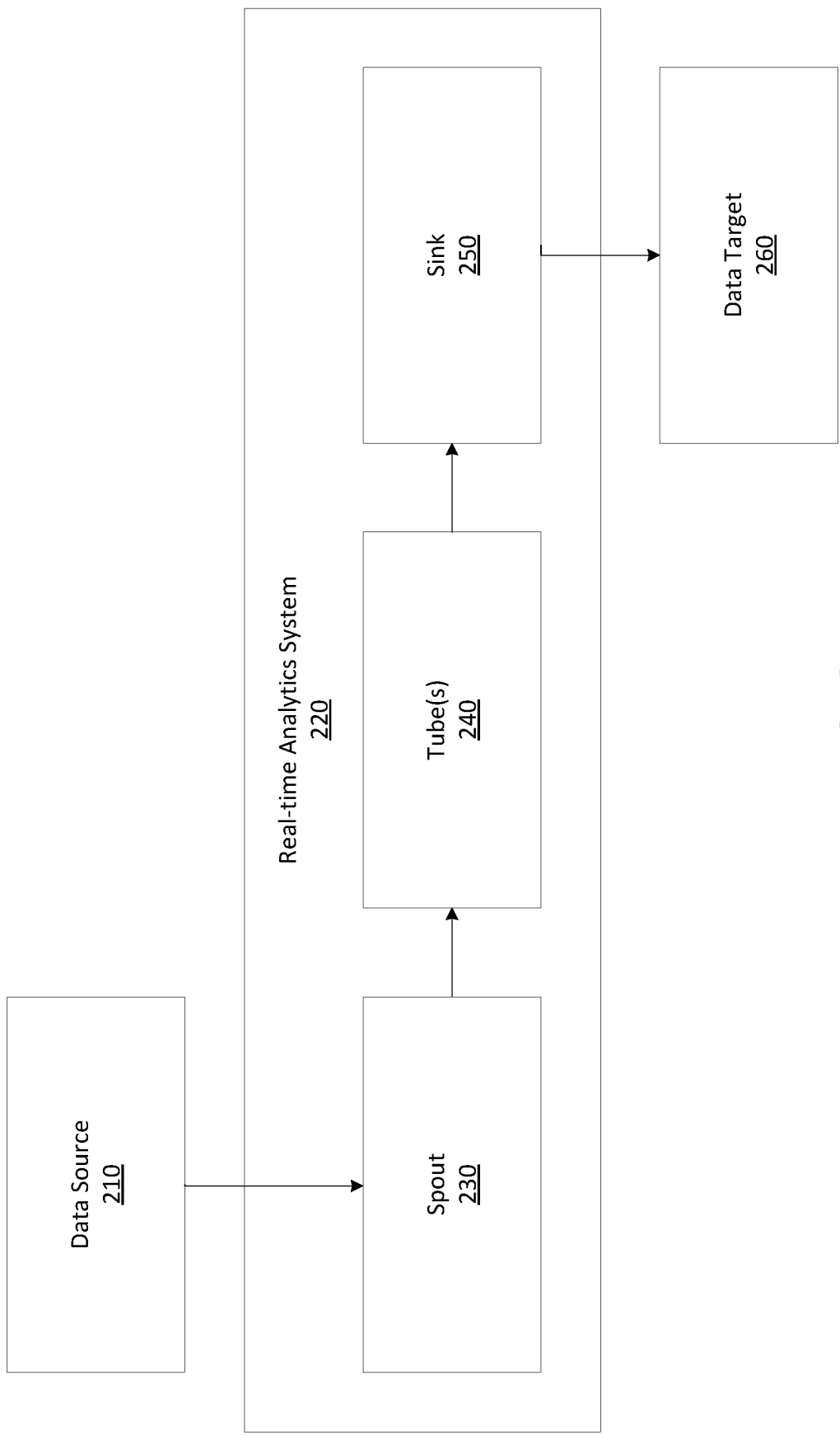
FIG. 2 illustrates an example of components of a real-time analytics system.

FIG. 2 illustrates an example of components of a real-time analytics system 220. In some examples, the components may include a spout 230, one or more tubes 240, and a sink 250. In such examples: the spout 230 may receive data from a data source 210 (which may correspond to the one or more data sources discussed in FIG. 1); the one or more tubes 240 may perform one or more operations on data; and the sink 250 may send (or store/write) data to a data target 260 (which may correspond to the one or more data targets discussed in FIG. 1). In some examples, the one or more tubes 240 may perform the one or more operations sequentially. For example, with three tubes: a first tube may perform a first operation on data; a second tube may perform a second operation on the data or on a result of the first operation; and a third tube may perform a third operation on the data, on the result of the first operation, or on a result of the second operation.

In some examples, the components of the real-time analytics system 220 may communicate with each other using one or more message queues. For example, a message queue may be associated with each component such that data received by a component is inserted into a corresponding message queue. A message queue may allow a component to operate on data in an order that the component received the data.

Figure 3:
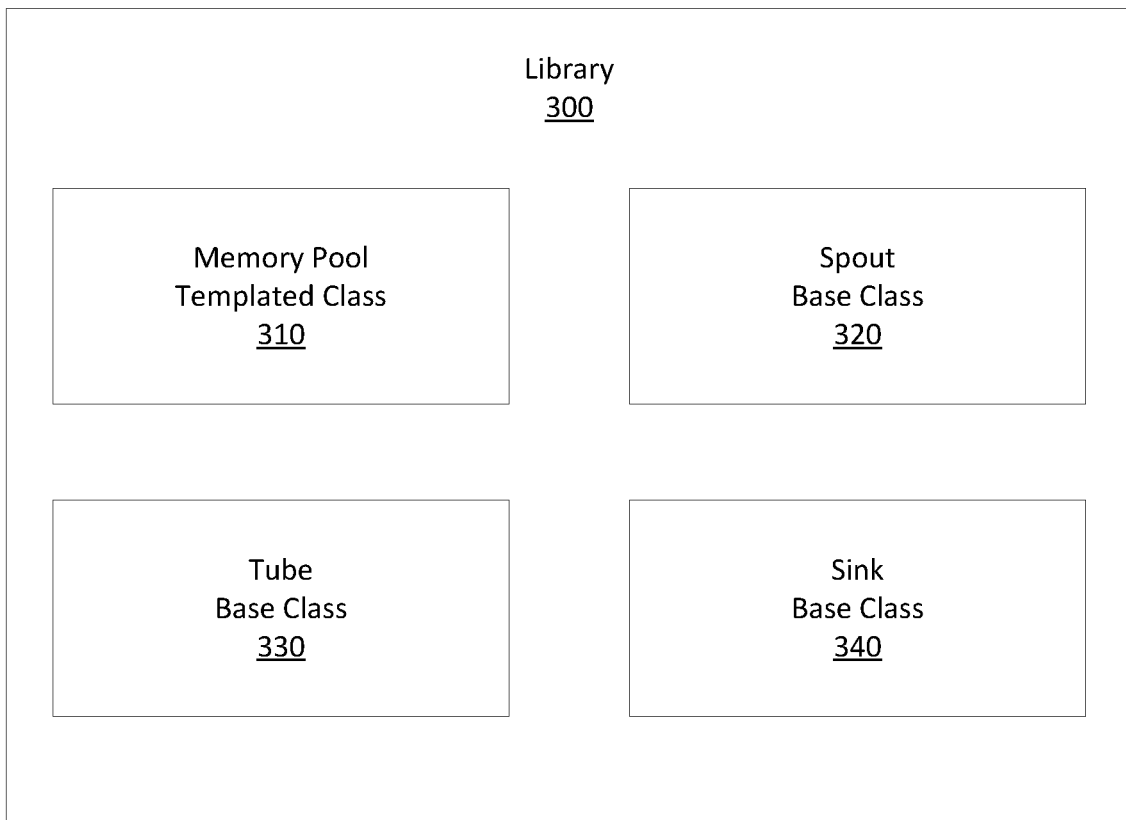
FIG. 3 illustrates an examples of a library for facilitating real-time analytics.

FIG. 3 illustrates an examples of a library 300 for facilitating real-time analytics. In some examples, the library may be a collection of modules that a programmer may utilize when implementing a method in a computer programming language. In such examples, the collection of modules may be object code (e.g., precompiled binary). Object code may be what a computer compiler produces. In some examples, object code may be a sequence of statements or instructions in a computer language (such as machine code language (i.e., binary) or an intermediate language (such as register transfer language)). In some examples, a module of the collection of modules may be precompiled binary, code, or routines that may be used during execution of a program.

In some examples, the library 300 may be written using a general-purpose programming language. In such examples, the general-purpose programming language may be a high-level programming language (e.g., C or C++). Using a programming language such as C or C++ may provide more control of the use of memory (as opposed to a programming language such as Java). For example, C++ runs natively (no virtualization), which may allow for a lighter weight footprint as well as opportunity for low level speed optimization in data structures. In some examples, the library 300 may provide memory management, customization, and speed for performing real-time analytics.

In some examples, the library 300 may provide a generic framework for ingesting data using a spout, processing the data using one or more tubes, writing (or storing) the processed data using a sink, and managing memory throughout each step using a memory pool.

To provide the generic framework, the library 300 may include one or more templated classes (e.g., a memory pool templated class 310) and/or one or more base classes (e.g., a spout base class 320, a tube base class 330, and a sink base class 340). A templated class may allow behavior of a class to be defined without identifying one or more datatypes to be handled by one or more operations of the class. A base class (sometimes referred to as a parent class or a superclass) may be a class from which other classes are derived. Deriving a class from a base class may allow implementation of custom business logic that may be executed on incoming data tuples. In some examples, a class may extend a base class. The base class may facilitate the creation of other classes that may reuse code implicitly inherited from the base class. In some examples, a programmer may extend base class functionality by adding or overriding members relevant to the derived class.

In some examples, a class derived from a base class may inherit both data and behavior from the base class. In such examples, a base class may be automatically instantiated before a derived class. The derived class may communicate to the base class during instantiation by calling a base class constructor with a matching parameter list. In some examples, base class members may be accessed from the derived class through an explicit cast.

In some examples, the memory pool templated class 310 may be a C++ templated utility thread safe class that is used for reducing memory allocations by preallocating chunks of memory from the heap. The memory pool templated class 310 may use custom buffer pools (e.g., memory pools) to allow a real-time analytics system to reuse memory instead of performing calls for memory allocation when generating new tuples and/or creating multiple copies of data in memory.

In some examples, the spout base class 320 may be a Primitive C++ Operator base class that is used for generating tuples and sending the tuples to be processed by other operators. The spout base class 320 may be efficient at reading data from a single or multiple sources such as data files or real time streams of data.

In some examples, the tube base class 330 may be a primitive C++ Operator base class that is used for reading and processing tuples from the spout base class 320, as well as storing aggregations, correlations, computations, and/or look-ups. In some examples, a tube derived from the tube base class 330 may include custom, client-specific logic and computations for performing functions (e.g., correlations, computations, filters, and/or aggregations).

In some examples, the sink base class 340 may be a Primitive C++ Operator base class that is used for writing tuples out to other systems downstream. The sink base class 340 may be used to flush aggregate data or flush computed data to external databases or downstream applications. In some examples, logic to load a database or write a file may be contained in a sink derived from the sink base class 340.

FIG. 4A illustrates an example of a heap 410 with unallocated memory. The heap 410 may be a location in memory where memory may be allocated for random access. Unlike a stack, where memory is allocated and released in a defined order, individual data elements allocated on the heap may be released in ways which is asynchronous from one another. Any such data element may be freed when a real-time analytics system explicitly releases a corresponding pointer.

While the heap 410 is illustrated as having four blocks of memory (e.g., unallocated memory 412, 414, 416, 418), it should be recognized that the heap 410 may be smaller or bigger. In some examples, each block of memory may be a particular amount of memory (e.g., 1 byte, 1 megabyte, 50 megabytes, etc.). It should be recognized that each block may be the same or different sizes.

Using the memory pool as discussed above, the real-time analytics system may keep memory allocated to it on the heap 410 even after a variable stored in the memory is not being used by the real-time analytics systems. For example, a corresponding pointer of the memory not being used might not be released back to the heap 410. In some examples, the task of fulfilling an allocation request for the heap 410 may include locating a block of unused memory of sufficient size.

FIG. 4B illustrates an example of a heap 420 with allocated (e.g., allocated memory 426) and unallocated memory (e.g., unallocated memory 422, 424, 428). The heap 420 may correspond to the heap 410 after a block of memory has been allocated. In some examples, a real-time analytics system (e.g., the real-time analytics system 220) may cause the allocated memory 426 to be allocated. In such examples, the real-time analytics system may identify an amount of memory needed and send the amount of memory needed to the heap 420. In other examples, the real-time analytics system may request a particular number of blocks from the heap 420.

In response to the amount of memory needed, the heap 420 may allocate a portion of memory of the heap (e.g., the allocated memory 426) and send a pointer to the real-time analytics system identifying the allocated memory 426. In some examples, a pointer may be a programming language object, whose value refers to another value stored in a memory address. In such examples, a pointer may reference a location in memory. Pointers to data may improve performance for operations because the data does not need to be sent between components (just a pointer).

Figure 5:
FIG. 5 illustrates an example of a memory pool.

FIG. 5 illustrates an example of a memory pool 510. The memory pool 510 may be a templated class (e.g., the memory pool templated class 310). In some examples, the memory pool 510 may allow specification of a data-type of the memory pool 510 to be instantiated. The memory pool 510 may manage memory for a real-time analytics system (e.g., the real-time analytics system 220). For example, the memory pool 510 may cause memory to be allocated from a heap (e.g., the heap 420). Allocation may include using a command such as malloc( ) or calloc( ) to associate the allocated memory to be associated with a pointer (as described herein). In addition, a command such as free( ) may be used to deallocate the memory once the memory is not needed anymore.

Once the memory is allocated, the memory pool 510 may reserve portions of the allocated memory for data used by the real-time analytics system. Reserving, as opposed to allocating, may be in reference to the memory pool 510 rather than the heap. In some examples, when allocated memory is unreserved after being reserved, the pointer associated with the allocated memory may be sent to the memory pool 510 rather than having a command such as free( ) be called (as described above). For example, the memory pool 510 may store data in the allocated memory and provide a corresponding pointer for the data. In such an example, when the real-time analytics system is done with the data associated with the pointer, the memory pool 510 may unreserve that portion of the allocated memory rather than unallocate the portion of the allocated memory. By unreserving rather than unallocating, the memory pool 510 may bypass having to allocate and deallocate memory using the heap. Instead, the memory pool 510 may reuse allocated memory. The memory pool 510 allows for bulk allocation of memory instead of individual allocations, thereby increasing performance.

In some examples, the memory pool 510 may allow for more efficient use of memory, particular when using multiple threads and trying to allocate memory across the multiple threads at the same time. In some examples, the memory pool 510 may track use of the allocated memory using a linked list. For example, the link list may be built from a memory node class that includes one or more pointers to allocated memory as well as a next element in the list. The memory pool 510 may cause memory to be allocated in chunks, rather than allocating memory for each call.

To illustrate the memory pool 510, rows corresponding to memory locations are illustrated. For example, memory location 0 (520) may be a first memory location. The memory location 0 may be a size corresponding to a tuple of data generated by the real-time analytics system (as will be described below). In some examples, the memory location 0 may be associated with a tuple 0. Therefore, a component may obtain a pointer pointing to the memory location 0 when the component is operating on the tuple 0. Similarly, memory location 3 (550) may be reserved for tuple 1.

In some examples, one or more memory locations may be unreserved (e.g., memory location 1 (530) and memory location 2 (540)). A memory location may be unreserved when it has been allocated from the heap but the memory pool 510 has not associated the memory location with data. In some examples, the memory location could have been associated with data in the past, which would cause the memory location to include values corresponding to the past data. In other examples, the memory location could not have been associated with data in the past, which would cause the memory location to be empty, null, or include some insignificant value.

Figure 6:
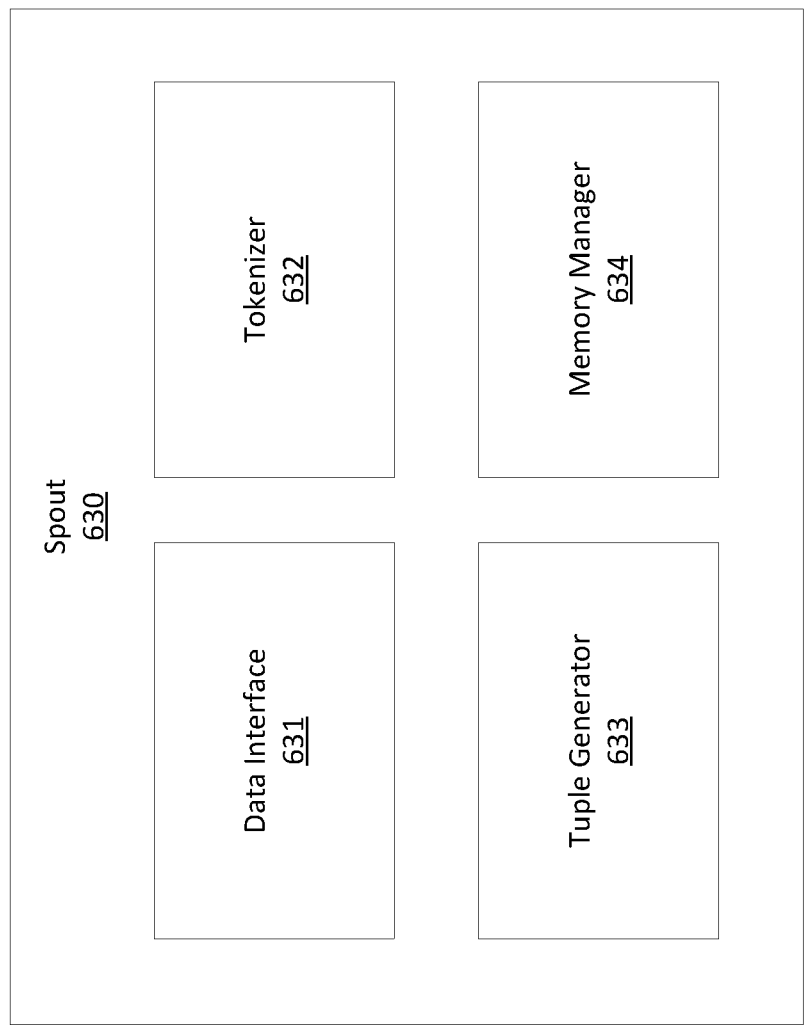
FIG. 6 illustrates an example of a spout.

FIG. 6 illustrates an example of a spout 630. The spout 630 may be derived from a spout base class (e.g., the spout base class 320). In some examples, the spout 630 may inherit the spout base class. In such examples, deriving the spout 630 may include implementing a virtual function "nextTuple( )" which may include logic for creating tuples that will be sent downstream. In some examples, the spout 630 may be customized and built using the spout base class as a template. In some examples, the spout 630 may include a data interface 631 to identify data from one or more data sources (e.g., the source database 110, the source file 112, the source data stream 114 and/or the source application 116). In some examples, the data interface 631 may ingest, receive, obtain, or read the identified data. For example, different data sources may have different interfaces (e.g., an Application Programming Interface (API)). The data interface 631 may be configured to interact with each of the one or more data sources.

In some examples, the spout 630 may further include a tokenizer 632 to define how to interpret data from the one or more data sources. For example, the tokenizer 632 may use one or more string functions to identify one or more lines from the data. In addition, the tokenizer 632 may include one or more functions to handle different forms, layouts, or any other differences between data sources. For example, different data sources may configure data differently. The tokenizer 632 may include logic, instructions, or code to properly parse the data.

In some examples, the spout 620 may further include a tuple generator 633 to generate one or more tuples using the parsed data. In some examples, the tuple may include one or more fields for the data. For example, if data received form a data source includes a name, an address, and a phone number of several people, a tuple may be associated with a person, including the name, the address, the phone number, or any combination thereof associated with the person. In other examples, the tuple may be associated with the data, including names, addresses, and phone numbers of more than one person (possibly all of the people). In some examples, the one or more tuples may be normalized across different data sources. For example, if a particular data source includes a field that another data source does not include, a tuple may be generated with the field occupied for the particular data source and empty for the other data source.

In some examples, incoming data may be filtered by the tuple generator 633 such that some data is not added to a tuple. In such examples, the spout 620 may include logic to determine what data to add to the tuple. For example, the spout 620 may identify that a city and a state of a person is irrelevant. In such an example, the city and the state of the person might not be added to a tuple.

In some examples, the spout 620 may further include a memory manager 634 to manage memory from a memory pool (e.g., the memory pool 510) for generating one or more tuples. In such examples, the memory manager 634 may communicate with the memory pool to determine and keep track of memory to be used for a tuple. For example, a portion of memory sufficient for the tuple may be reserved in the memory pool such that other tuples cannot use the same portion of memory. By using the memory pool rather than a heap or stack of a computer system, the spout 620 does not need to allocate and deallocate memory for new tuples. Instead, the spout 620 may use and reuse memory in the memory pool.

After generating the one or more tuples, the spout 630 may associate a pointer with one or more tuples. Then, rather than sending the one or more tuples to a tube (or a message queue of the tube), the spout 630 may send one or more pointers to the tube (or a message queue of the tube).

Figure 7:
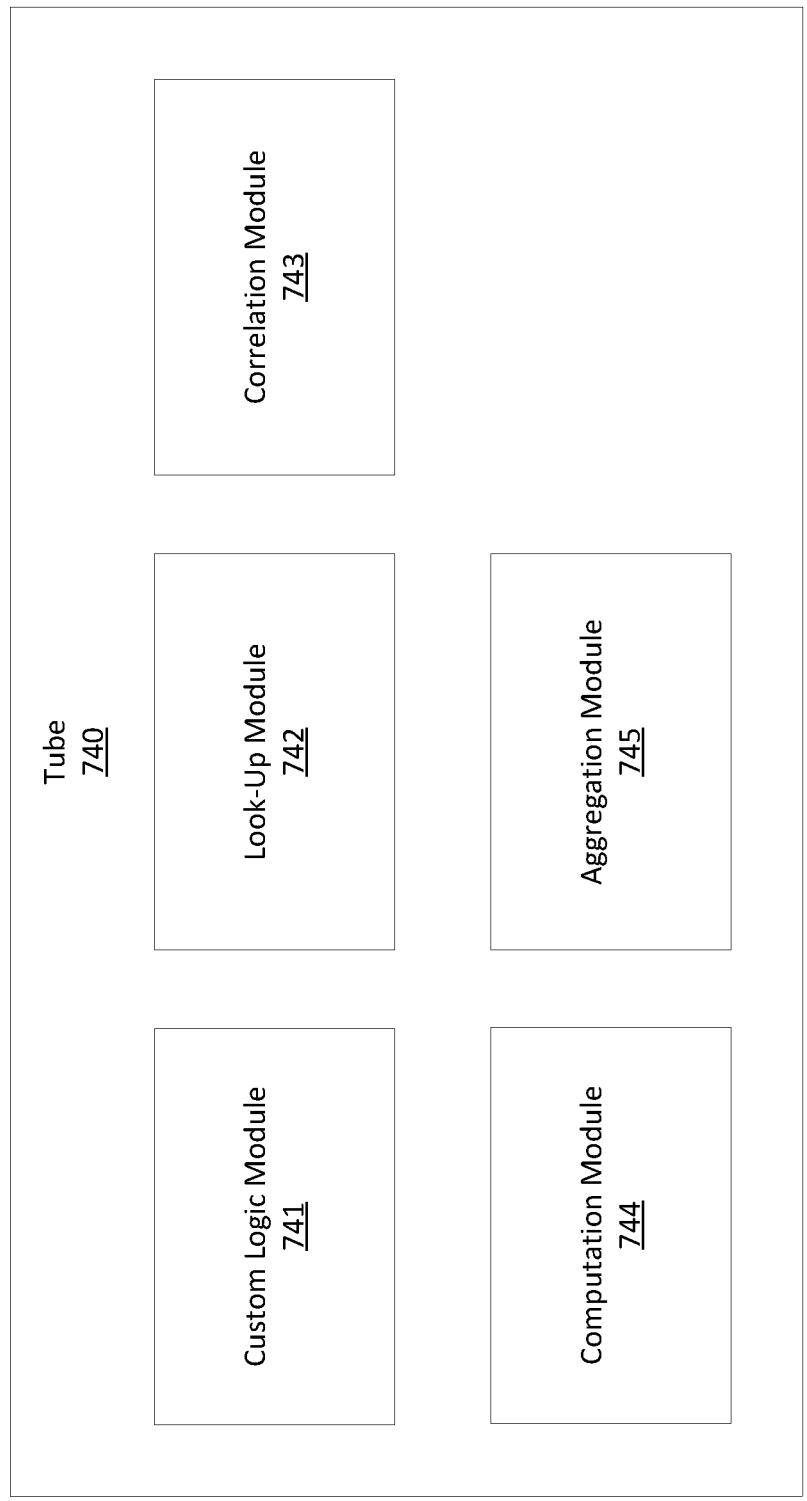
FIG. 7 illustrates an example of a tube.

FIG. 7 illustrates an example of a tube 740 to perform one or more operations on a tuple. The tube 740 may be derived from a tube base class (e.g., the tube base class 340). In some examples, the tube 740 may inherit the tube base class. In such examples, deriving the tube 740 may include implementing a virtual function "process(tuple)," which may include logic for processing a tuple that is passed into a function and returning the tuple that will be sent downstream. In some examples, the tube 740 may be customized and built using the tube base class as a template. In some examples, the tube 740 may be included (e.g., installed or executing) on one or more computer systems (or one or more processors). In such examples, when the tube 740 is duplicated, the one or more operations may be run in parallel between the different instances of the tube 740.

In some examples, a custom logic module 741 of the tube 740 may identify an operation of the one or more operations to perform on the tuple. In some examples, the custom logic module 741 may be added to the tube base class (e.g., the tube base class 330). In other words, the custom logic module 741 may be customized for particular data sources by a user when expanding the tube base class into the tube 740.

To facilitate performance of the one or more operations, the tube 740 may include a look-up module 742, a correlation module 743, a computation module 744, an aggregation module 745, or any combination thereof. In some examples, the memory pool might need to be accessed by a module of the tube 740. For example, when a tuple is being modified, created, or destroyed, the memory pool might be needed. In such examples, the memory pool may manage memory as necessary.

The look-up module 742 may match additional data from one or more data sources to be used for an operation on a tuple. For example, the additional data may be added to the tuple. For another example, the additional data may be used to validate, compare, or modify data in the tuple.

In some examples, the look-up module 742 may include a custom data map that identifies data in one or more data sources. The custom data map may indicate a type of data in a data source such that the look-up module 742 may identify a data source. To illustrate a look up, the look-up module 742 may be requested to find a zip code for an address. In such an illustration, the look-up module 742 may identify a database with zip code information using the custom data map, and may obtain the zip code information from the database. For another example, a serial/sku number of a device in a database that includes attributes about the device may be searched.

The correlation module 743 may correlate data in one or more tuples. For example, the correlation module 743 may correlate a first field of a tuple with a second field of the tuple. For another example, the correlation module 743 may correlate at least a portion of a first tuple with at least a portion of a second tuple. For purposes of this module, correlate may mean to have a mutual relationship or connection. To illustrate a correlation, the correlation module 743 may join data between streams. Joining data may allow a system to buffer data from one source and perform a lookup from another, thus enriching the data.

The computation module 744 may perform one or more computations on one or more fields of one or more tuples. For example, the computation module 744 may perform an operation with a first tuple and a second tuple as a parameter. For another example, the computation module 744 may perform an operation on a tuple to augment the tuple. For another example, the computation module 744 may perform an operation with a first field of a tuple and a second field of the tuple as parameters. To illustrate a computation, a first field in a tuple may be added to a second field in the tuple to create a summation of the two fields.

The aggregation module 745 may gather data from two or more fields (or two or more tuples) to provide aggregated data. Aggregation may include creating a list of attributes of fields or combining fields together. To illustrate an aggregation, the aggregation module may gather addresses of several tuples into a single list and perform a function (e.g., summation, average, minimum, or maximum) on the single list.

Figure 8:
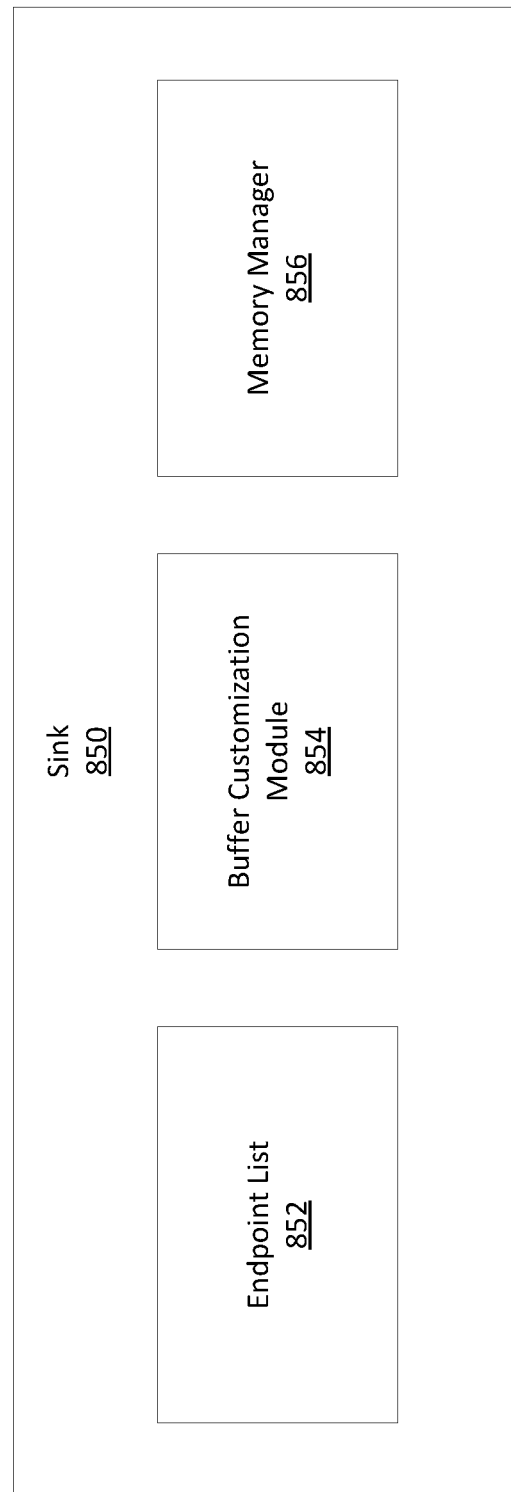
FIG. 8 illustrates an example of a sink.

FIG. 8 illustrates an example of a sink 850. The sink 850 may be derived from a sink base class (e.g., the sink base class 340). In some examples, the sink 850 may inherit the sink base class. In such examples, deriving the sink 850 may include implementing a virtual function "process(item)," which may include logic for writing data out of a system (e.g., to a flat file or an external system such as a database or message queue). The virtual function process(item) may also deallocate memory back to a memory pool for a new tuple. In some examples the sink 850 may be customized and built using the sink base class as a template. In some examples, the sink 850 may receive tuples that have been processed by one or more tubes in a real-time analytics system. The sink 850 may send or write the tuples (or information from the tuples) to one or more data targets (e.g., the target database 130, the target file 132, and the target application 134). The sink 850 may include an endpoint list 852, a buffer customization module 854 and a memory manager 856.

The endpoint list 852 may include information regarding the one or more data targets. For example, the endpoint list 852 may include identification information of the one or more data targets to be used to send data to the one or more data targets. In such examples, the endpoint list 850 may also include logic, code, or one or more instructions to identify a data target for a particular tuple.

After a data target is identified, the sink 850 may send at least some of the data associated with the particular tuple to the data target. In some examples, sending may be based upon configuration information associated with the data target. For example, the configuration information may define a format to send the data to the data target. In some examples, sending the data to a data target may include storing the data in the data target. For example, data associated with a tuple may be stored in the target database 130 or the target file 132. In some examples, the an API of the target application 134 may be used by the sink 850 to send the data to the target application 134.

In some examples, when sending data to data targets, the buffer customization module 854 may cause data to accumulate before sending to a data target. For example, the buffer customization module 854 may require a particular amount of data to be ready to send to a data target before the data is actually sent to the data target. By sending in batches, efficiency may be gained over sending after each tuple is processed. In some examples, one or more buffers created due to the buffer customization module 854 may be flushed by one or more dedicate threads to allow for asynchronous processing, thereby increasing performance.

In some examples, after data is sent to one or more data targets, the memory in the heap associated with the data may be set to be available for the memory pool. In some examples, the data may be removed from the heap (e.g., setting the memory to empty, null, or some other insignificant value). In other examples, the data may be left in the memory locations even after the memory location is designated as available for future data (or unreserved).

Figure 9:
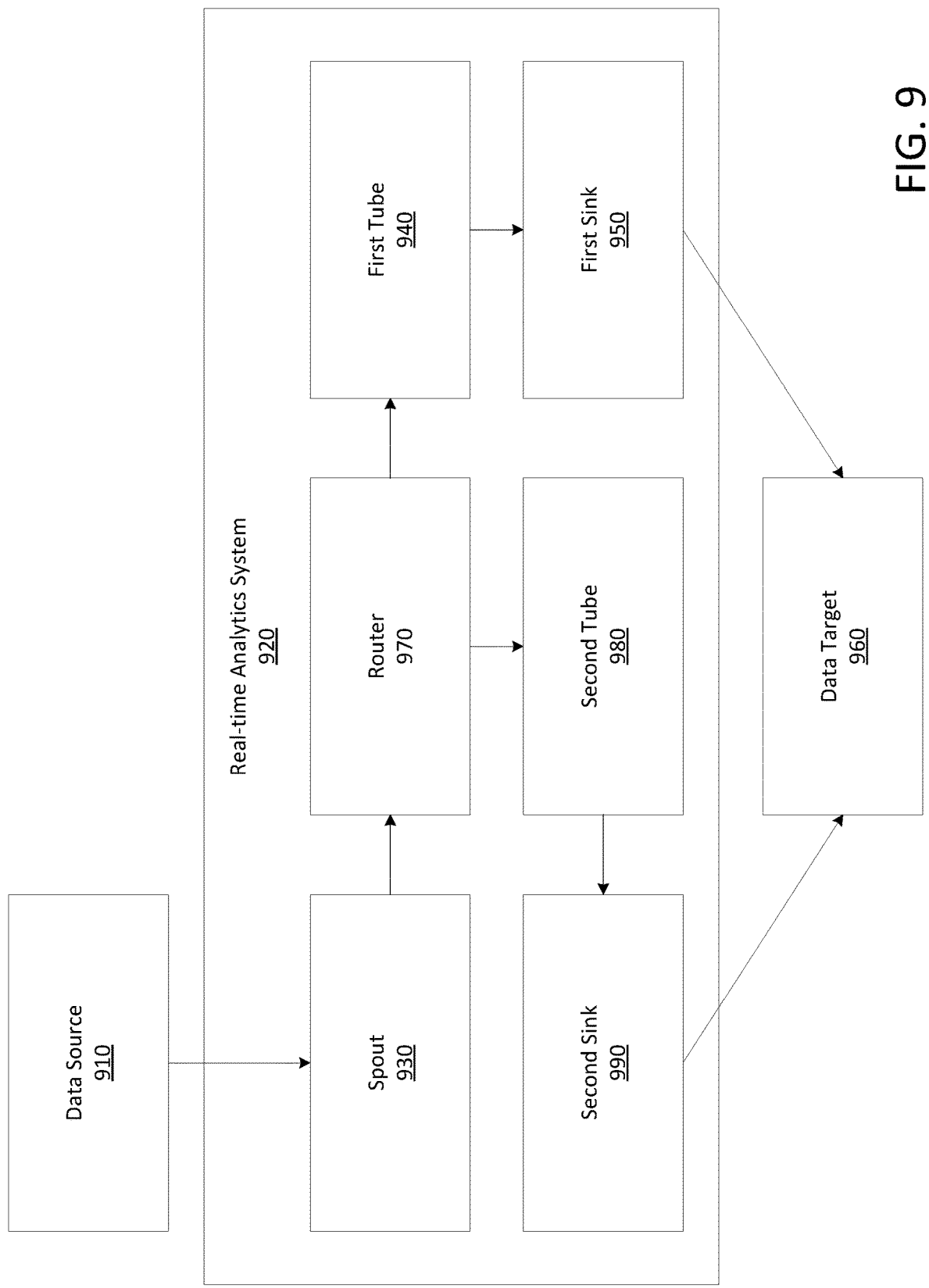
FIG. 9 illustrates an example of a real-time analytics system using a router.

FIG. 9 illustrates an example of a real-time analytics system 920 using a router 970. The router 970 may be derived from a router base class. In some examples, the router 970 may inherit the router base class. In such examples, deriving the router 970 may include implementing a virtual function "process(item)," which may include logic for determining how to route one or more incoming tuples to one or more outputs. In some examples, the router 970 may be customized and built using the router base class as a template.

In some examples, the router 970 may allow two or more tubes to be run in parallel (e.g., a first tube 940 and a second tube 980). In some examples, the router 970 may send one or more tuples to multiple message queues, each message queue associated with a different tube. For example, one or more first tuples may be sent to the first tube 940 and one or more second tuples may be sent to the second tube 980. In such an example, the one or more first tuples may be the same, different, or partially different than the one or more second tuples. In some examples, the router 970 may include logic to determine how to distribute the data to one or more tubes and/or one or more message queues.

In some examples, the router 970 may be used to provide parallelism by having multiple instances of a tube. For example, a first instance of a tube located on a first computer system may run in parallel with a second instance of the tube located on a second computer system.

The router 970 may be a Primitive C++ Operator base class that is used for sharding tuples to downstream operators. In some examples, the router 970 may distribute/shard data across internal message queues of a real-time analysis system.

In some examples, the first tube 940 may send a pointer and/or output to a first sink 950, which may write, store, or send data to a data target 960 as described above. The second tube 980 may send a pointer and/or output to a second sink 990, which may write, store, or send data to the data target 960. In other examples, the second sink 990 may write, store, or send data to a second data target (not illustrated). In other examples, a pointer and/or output from the first tube 940 may be combined with a pointer and/or output from the second tube 980 such that the combined pointers and/or output may be sent to a single additional tube and/or a single sink. In other examples, a tube and/or sink may receive pointers and/or outputs from multiple sources such that the first tube 940 and the second tube 980 may send a pointer and/output to a single tube and/or sink.

Processes 1000 and 1100 are illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the processes 1000 and 1100 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 10:
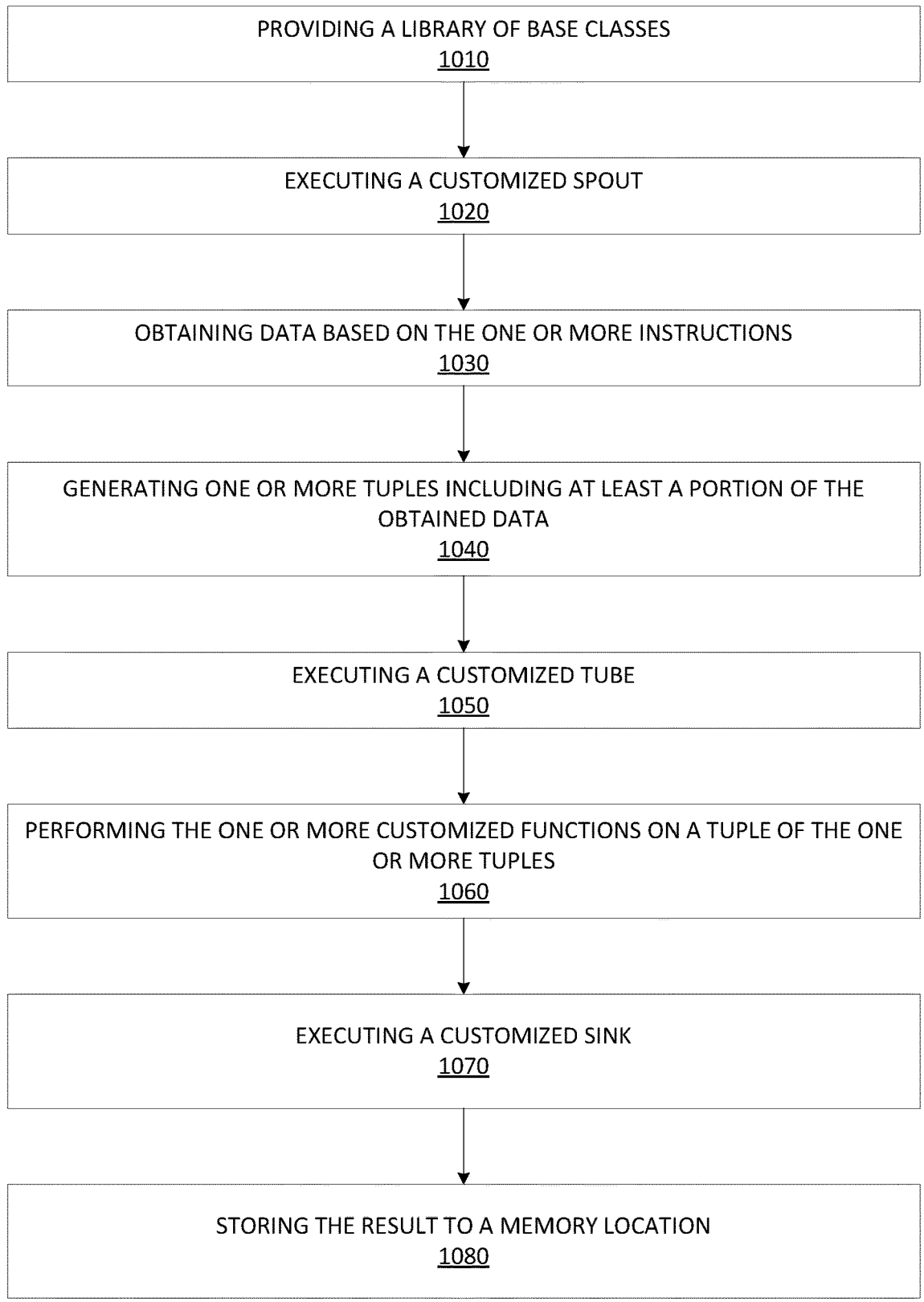
FIG. 10 is a flowchart illustrating an example of a process for real-time analytics tracking.

FIG. 10 is a flowchart illustrating an example of a process 1000 for real-time analytics tracking. In some examples, the process 1000 may include providing a library of base classes (1010). In some examples, a base class may include a header and a precompiled binary. The header may expose the base class to an application using the library, and the precompiled binary may include implementation of the base class. In some examples, the base classes may include a spout base class, a tube base class, and a sink base class.

In some examples, the process 1000 may further include executing a customized spout (1020). In some examples, the customized spout may be derived from the spout base class.

In such examples, the customized spout may include one or more instructions for obtaining data.

In some examples, the process 1000 may further include obtaining data based upon the one or more instructions (1030). In some examples, the data may be obtained using the customized spout.

In some examples, the process 1000 may further include generating one or more tuples including at least a portion of the obtained data (1040). In some examples, the one or more tuples may be generated using the customized spout. In some examples, a tuple may be associated with a pointer. In such examples, the pointer may refer to a memory location of the tuple. In some examples, generating a tuple may include filtering the data based upon the one or more instructions of the customized spout.

In some examples, the process 1000 may further include executing a customized tube (1050). In some examples, the customized tube may be derived from the tube base class. In such examples, the customized tube may include one or more functions to perform on the one or more tuples using one or more pointers corresponding to the one or more tuples. In some examples, the one or more customized functions might not be defined in the tube base class. In some examples, the process 1000 may further include executing a second customized tube using the tube base class. In such examples, the second customized tube may be derived from the tube base class and may be different from the customized tube.

In some examples, the process 1000 may further include performing the one or more customized functions on a tuple of the one or more tuples (1060). In some examples, the one or more customized functions may be performed using the customized tube. In some examples, a customized function of the one or more customized functions of the customized tube may be a look-up function, a correlation function, a computation function, or an aggregation function.

In some examples, the process 1000 may further include executing a customized sink (1070). In some examples, the customized sink may be derived from the sink base class. In such examples, the customized sink may include one or more endpoints for a result of performing the one or more customized functions on the one or more tuples.

In some examples, the process 1000 may further include storing the result to a memory location (1080). In some examples, the result may be stored using the customized sink.

In some examples, the process 1000 may further include creating a memory pool. In some examples, the memory pool may be a templated class. In such examples, the process 1000 may further include allocating a predefined amount of memory on a heap of a computer system. In some examples, the predefined amount of memory may be allocated using the memory pool. In such examples, the heap may be memory set aside for dynamic allocation. In some examples, the process 1000 may further include providing allocated memory to the spout for generation of the tuple. In some examples, the allocated memory may be provided by the memory pool. In such examples, the predefined amount of memory on the heap may include the allocated memory. In some examples, the process 1000 may further include providing the allocated memory to the memory pool in response to writing the result to the memory location. In such examples, the allocated memory may be provided by the sink.

Figure 11:
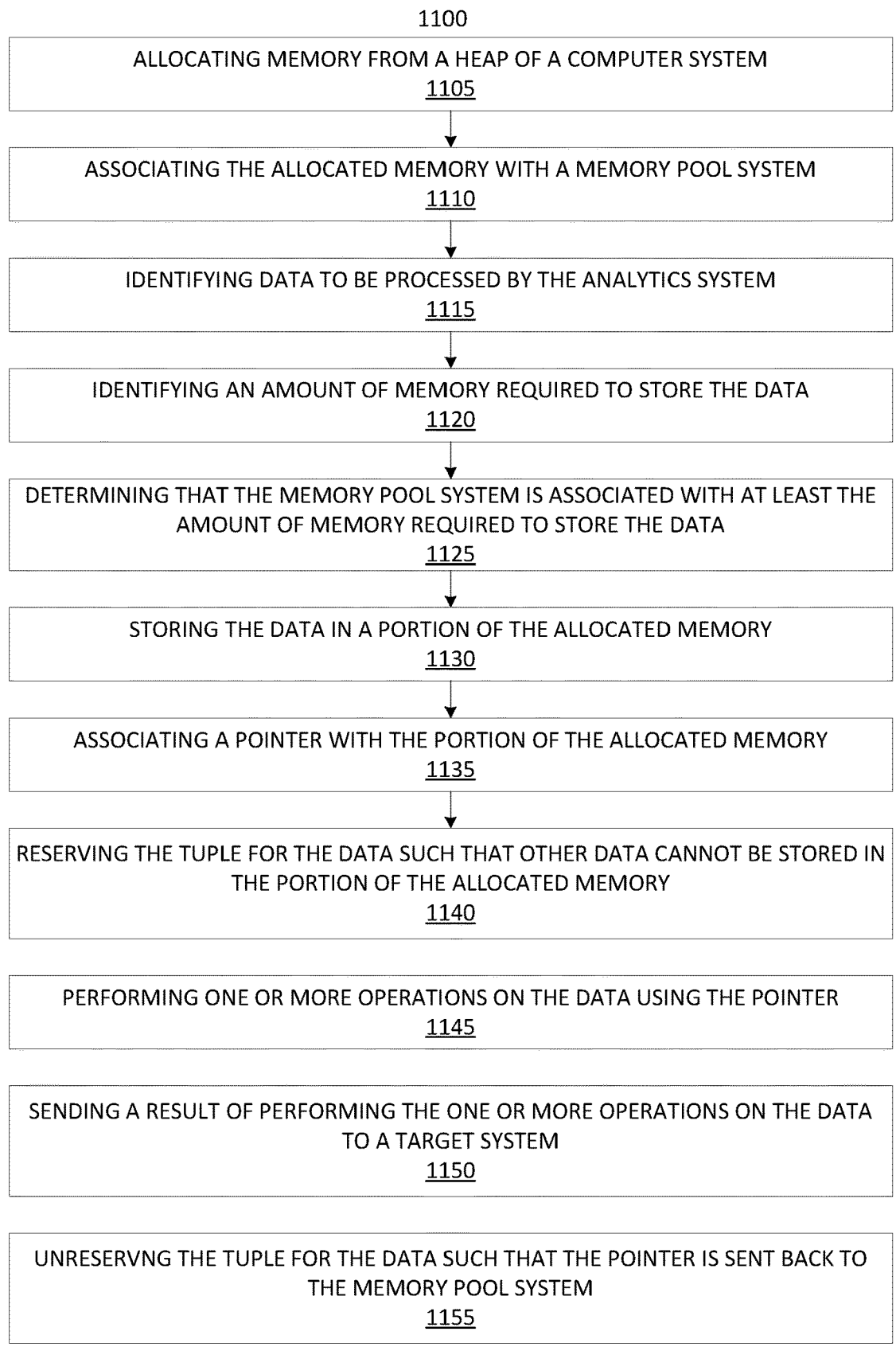
FIG. 11 is a flowchart illustrating an example of a process for managing memory for a real-time analytics system.

FIG. 11 is a flowchart illustrating an example of a process 1100 for managing memory for a real-time analytics system.

In some examples, the process 1100 may include allocating memory from a heap of a computer system (1105).

In some examples, the allocated memory may be a predefined size. In some examples, the process 1100 may further include associating the allocated memory with a memory pool system (1110). In some examples, the memory pool system may manage the allocated memory for the analytics system.

In some examples, the process 1100 may further include identifying data to be processed by the analytics system (1115), identifying an amount of memory required to store the data (1120), determining that the memory pool system is associated with at least the amount of memory required to store the data (1125), and storing the data in a portion of the allocated memory (1130).

In some examples, the process 1100 may further include associating a pointer with the portion of the allocated memory (1135). In some examples, the pointer may be a value that identifies the portion of the allocated memory. In such examples, the memory pool system may include the pointer.

In some examples, the process 1100 may further include reserving the tuple for the data such that other data cannot be stored in the portion of the allocated memory (1140), performing one or more operations on the data using the pointer (1145), and sending a result of performing the one or more operations on the data to a target system (1150).

In some examples, the process 1100 may further include unreserving the tuple for the data such that the pointer is sent back to the memory pool system (1155). In some examples, unreserving may be in response to the result being sent In some examples, the process 1100 may further include allocating additional memory from the heap in response to determining that the memory pool system is associated with less than the amount of memory required to store the additional data. In such examples, the additional memory may be the predefined size.

In some examples, the process 1100 may further include determining that a portion of the memory associated with the memory pool system is not being used. In such examples, the portion may be the size of the predefined amount. In some examples, the process 1100 may further include deallocating the portion of the memory.

Figure 12:
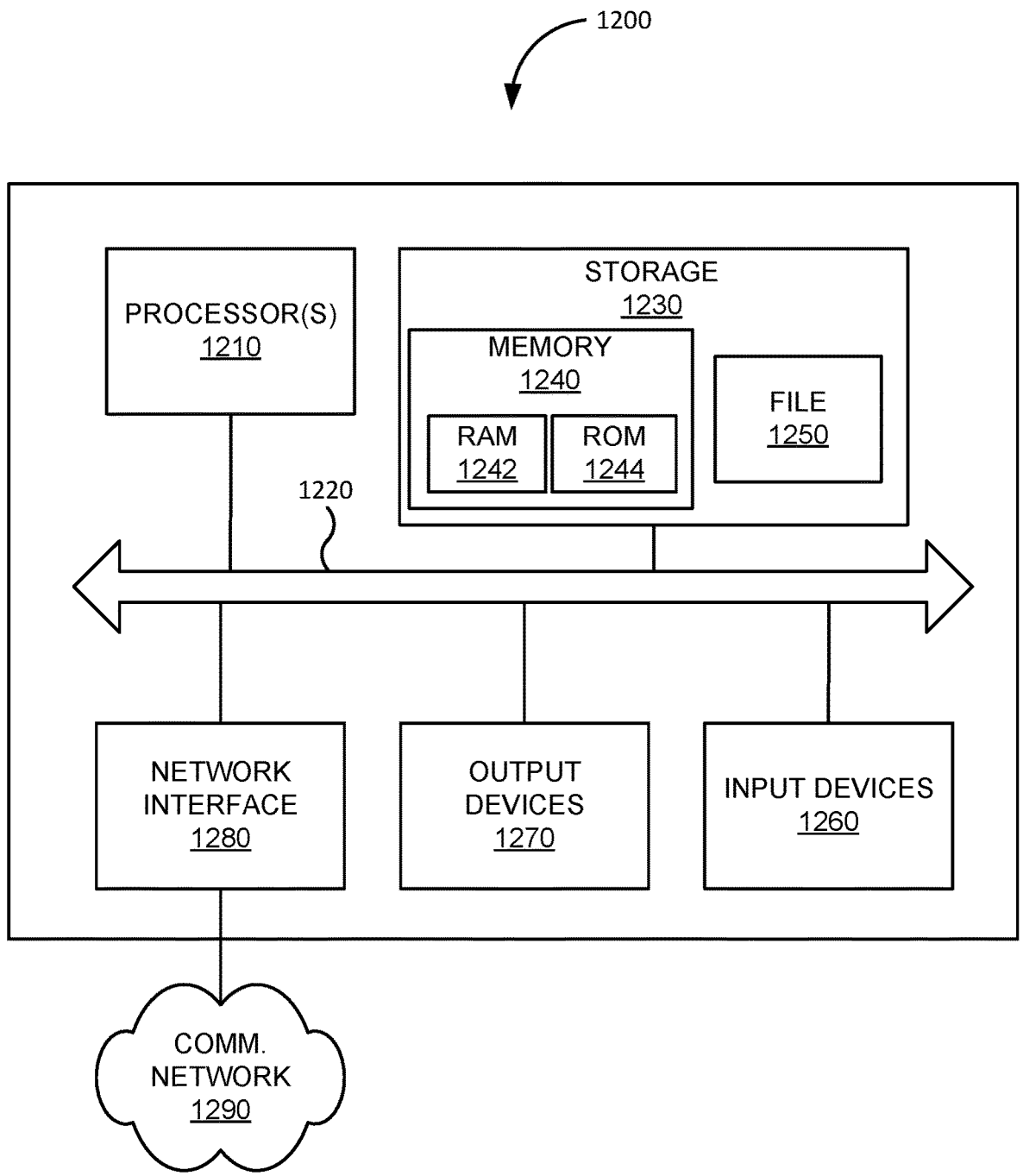
FIG. 12 illustrates an example of a block diagram of a computer system.

FIG. 12 illustrates an example of a block diagram of a computer system 1200. The computer system 1200 may include a monitor 1210, computer 1220, a keyboard 1230, a user input device 1240, one or more computer interfaces 1250, and the like. In some examples, the user input device 1240 may be embodied as a computer mouse, a trackball, a track pad, a joystick, wireless remote, drawing tablet, voice command system, eye tracking system, and the like. The user input device 1240 may allow a user to select objects, icons, text and the like that appear on the monitor 1210 via a command such as a click of a button or the like.

In some examples, the computer interfaces 1250 may include an Ethernet card, a modem (telephone, satellite, cable, ISDN), (asynchronous) digital subscriber line (DSL) unit, FireWire interface, USB interface, and the like. For example, the computer interfaces 1250 may be coupled to a computer network 1255, to a FireWire bus, or the like. In other examples, the computer interfaces 1250 may be physically integrated on the motherboard of the computer 1220, may be a software program (e.g., soft DSL), or the like.

In some examples, the computer 1220 may include familiar computer components such as a processor 1260, and memory storage devices, such as a random access memory (RAM) 1270, disk drives 1280, and system bus 1290 interconnecting the above components.

The RAM 1270 and disk drive 1280 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, the computer system 100 may also include software that enables communications over a network such as the HTTP, TCP/IP, RTP/RTSP protocols, and the like. In alternative embodiments of the present disclosure, other communications software and transfer protocols may also be used, for example IPX, UDP or the like.

The features described above may be implemented in digital electronic circuitry, or in computer hardware, firmware, software, or in combinations of them. The apparatus may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube), LCD (liquid crystal display), LED (light emitting diode) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

A number of embodiments of this disclosure have been described. Nevertheless, it will be understood that various modification may be made without departing from the scope of this disclosure.

What is claimed is:

1. A method for real-time analytics tracking, the method comprising:
providing a library of base classes, wherein a base class includes a header and a precompiled binary, wherein the header exposes the base class to an application using the library, wherein the precompiled binary includes implementation of the base class, and wherein the base classes include a spout base class, a tube base class, and a sink base class;
executing a customized spout, wherein the customized spout is derived from the spout base class, and wherein the customized spout includes one or more instructions for obtaining data;
obtaining, using the customized spout, data based upon the one or more instructions;
generating, using the customized spout, one or more tuples including at least a portion of the obtained data, wherein a tuple is associated with a pointer, and wherein the pointer refers to a memory location of the tuple;
executing a customized tube, wherein the customized tube is derived from the tube base class, wherein the customized tube includes one or more customized functions to perform on the one or more tuples using one or more pointers corresponding to the one or more tuples, and wherein the one or more customized functions are not defined in the tube base class;

performing, using the customized tube, the one or more customized functions on a tuple of the one or more tuples;

executing a customized sink, wherein the customized sink is derived from the sink base class, and wherein the customized sink includes one or more endpoints for a result of performing the one or more customized functions on the one or more tuples; and storing, using the customized sink, the result to a memory location, wherein the spout base class, the tube base class, and the sink base class are primitive operators for user derivation and wherein the spout base class is configured to receive data from a data source, the tube base class is configured to process the recieved data by performing one or more operations on the received data, and the sink base class is configured to send the processed data to a data target.

2. The method of claim 1, further comprising:

creating a memory pool, wherein the memory pool is a templated class; allocating, using the memory pool, a predefined amount of memory on a heap of a computer system, wherein the heap is memory set aside for dynamic allocation;

providing, by the memory pool, allocated memory to the customized spout for generation of the customized tuple, wherein the predefined amount of memory on the heap includes the allocated memory; and providing, by the customized sink, the allocated memory to the memory pool in response to writing the result to the memory location.

3. The method of claim 2, further comprising:

allocating additional memory from the heap in response to determining that the memory pool system is associated with less than the amount of memory required to store the data, wherein the additional memory is the predefined size.

4. The method of claim 3, further comprising:

determining that a portion of the memory associated with the memory pool system is not being used, wherein the portion is the size of the predefined amount; and deallocating the portion of the memory.

5. The method of claim 1, wherein a customized function of the one or more customized functions of the customized tube is a look-up function, a correlation function, a computation function, or an aggregation function.

6. The method of claim 1, wherein generating a tuple includes filtering the data based upon the one or more instructions of the customized spout.

7. The method of claim 1, further comprising:

executing a second customized tube using the tube base class, wherein the second customized tube is derived from the tube base class, wherein the customized tube is a first customized tube, and wherein the first customized tube is different from the second customized tube.

8. A non-transitory computer-readable storage medium storing a plurality of instructions executable by one or more processors, the plurality of instructions when executed by the one or more processors cause the one or more processors to:

provide a library of base classes, wherein a base class includes a header and a precompiled binary, wherein the header exposes the base class to an application using the library, wherein the precompiled binary includes implementation of the base class, and wherein the base classes include a spout base class, a tube base class, and a sink base class;

execute a customized spout, wherein the customized spout is derived from the spout base class, and wherein the customized spout includes one or more instructions for obtaining data;

obtain, using the customized spout, data based upon the one or more instructions; generate, using the customized spout, one or more tuples including at least a portion of the obtained data, wherein a tuple is associated with a pointer, and wherein the pointer refers to a memory location of the tuple;

execute a customized tube, wherein the customized tube is derived from the tube base class, wherein the customized tube includes one or more customized functions to perform on the one or more tuples using one or more pointers corresponding to the one or more tuples, and wherein the one or more customized functions are not defined in the tube base class;

perform, using the customized tube, the one or more customized functions on a tuple of the one or more tuples;

execute a customized sink, wherein the customized sink is derived from the sink base class, and wherein the customized sink includes one or more endpoints for a result of performing the one or more customized functions on the one or more tuples; and store, using the customized sink, the result to a memory location, wherein the spout base class, the tube base class, and the sink base class are primitive operators for user derivation and wherein the spout base class is configured to receive data from a data source, the tube base class is configured to process the received data by performing one or more operations on the received data, and the sink base class is configured to send the processed data to a data target.

9. The non-transitory computer-readable storage medium of claim 8, wherein the plurality of instructions when executed by the one or more processors further cause the one or more processors to:

create a memory pool, wherein the memory pool is a templated class; allocate, using the memory pool, a predefined amount of memory on a heap of a computer system, wherein the heap is memory set aside for dynamic allocation;

provide, by the memory pool, allocated memory to the customized spout for generation of the customized tuple, wherein the predefined amount of memory on the heap includes the allocated memory; and provide, by the customized sink, the allocated memory to the memory pool in response to writing the result to the memory location.

10. The non-transitory computer-readable storage medium of claim 9, wherein the plurality of instructions when executed by the one or more processors further cause the one or more processors to:

allocate additional memory from the heap in response to determining that the memory pool system is associated with less than the amount of memory required to store the data, wherein the additional memory is the predefined size.

11. The non-transitory computer-readable storage medium of claim 10, wherein the plurality of instructions when executed by the one or more processors further cause the one or more processors to:

determine that a portion the memory associated with the memory pool system is not being used, wherein the portion is the size of the predefined amount; and deallocate the portion of the memory.

12. The non-transitory computer-readable storage medium of claim 8, wherein a customized function of the one or more customized functions of the customized tube is a lookup function, a correlation function, a computation function, or an aggregation function.

13. The non-transitory computer-readable storage medium of claim 8, wherein generating a tuple includes filtering the data based upon the one or more instructions of the customized spout.

14. The non-transitory computer-readable storage medium of claim 8, wherein the plurality of instructions when executed by the one or more processors further cause the one or more processors to:

execute a second customized tube using the tube base class, wherein the second customized tube is derived from the tube base class, wherein the customized tube is a first customized tube, and wherein the first customized tube is different from the second customized tube.

15. A system comprising one or more processors; and a non-transitory computer-readable medium including instructions that, when executed by the one or more processors, cause the one or more processors to:

provide a library of base classes, wherein a base class includes a header and a precompiled binary, wherein the header exposes the base class to an application using the library, wherein the precompiled binary includes implementation of the base class, and wherein the base classes include a spout base class, a tube base class, and a sink base class;

execute a customized spout, wherein the customized spout is derived from the spout base class, and wherein the customized spout includes one or more instructions for obtaining data;

obtain, using the customized spout, data based upon the one or more instructions; generate, using the customized spout, one or more tuples including at least a portion of the obtained data, wherein a tuple is associated with a pointer, and wherein the pointer refers to a memory location of the tuple;

execute a customized tube, wherein the customized tube is derived from the tube base class, wherein the customized tube includes one or more customized functions to perform on the one or more tuples using one or more pointers corresponding to the one or more tuples, and wherein the one or more customized functions are not defined in the tube base class;

perform, using the customized tube, the one or more customized functions on a tuple of the one or more tuples;

execute a customized sink, wherein the customized sink is derived from the sink base class, and wherein the customized sink includes one or more endpoints for a result of performing the one or more customized functions on the one or more tuples; and store, using the customized sink, the result to a memory location, wherein the spout base class, the tube base class, and the sink base class are primitive operators for user derivation and wherein the spout base class is configured to receive data from a data source, the tube base class is configured to process the received the data by performing one or more operations on the received data, and the sink base class is configured to send the processed data to a data target.

16. The system of claim 15, wherein the instructions that, when executed by the one or more processors, further cause the one or more processors to:

create a memory pool, wherein the memory pool is a templated class; allocate, using the memory pool, a predefined amount of memory on a heap of a computer system, wherein the heap is memory set aside for dynamic allocation;

provide, by the memory pool, allocated memory to the customized spout for generation of the customized tuple, wherein the predefined amount of memory on the heap includes the allocated memory; and provide, by the customized sink, the allocated memory to the memory pool in response to writing the result to the memory location.

17. The system of claim 16, wherein the instructions that, when executed by the one or more processors, further cause the one or more processors to:

allocate additional memory from the heap in response to determining that the memory pool system is associated with less than the amount of memory required to store the data, wherein the additional memory is the predefined size.

18. The system of claim 17, wherein the instructions that, when executed by the one or more processors, further cause the one or more processors to:

determine that a portion of the memory associated with the memory pool system is not being used, wherein the portion is the size of the predefined amount; and deallocate the portion of the memory.

19. The system of claim 15, wherein a customized function of the one or more customized functions of the customized tube is a look-up function, a correlation function, a computation function, or an aggregation function.

20. The system of claim 15, wherein the instructions that, when executed by the one or more processors, further cause the one or more processors to:

execute a second customized tube using the tube base class, wherein the second customized tube is derived from the tube base class, wherein the customized tube is a first customized tube, and wherein the first customized tube is different from the second customized tube.

* * * * *